United States Patent [19]
Sartorio

[11] 3,771,230
[45] Nov. 13, 1973

[54] DEVICE FOR POSITIONING A WORKING MEMBER RELATIVELY TO A HOLDER AND WORKPIECE

[75] Inventor: Franco Sartorio, Turin, Italy

[73] Assignee: D. E. A. Digital Electronic Automation S.p.A., Turin, Italy

[22] Filed: June 3, 1971

[21] Appl. No.: 149,496

[30] Foreign Application Priority Data
July 29, 1970 Italy.................. 69616 A/70

[52] U.S. Cl............... 33/185 R, 33/79 R, 33/174 P, 248/281
[51] Int. Cl........................ B23q 9/00, F16h 21/00
[58] Field of Search ................. 33/108, 25 R, 25 B, 33/25 C, 25 D, 25 E, 185 RV, 201, 23 R, 23 B, 23 H, 23 K, 23 E, 1 CC, 174 J, 174 P, 79 A, 79 B, 79 C, 79 D, 151, 180 R, 179.5 E; 74/22, 23, 29, 30, 110; 90/13.1, 62; 248/280, 281

[56] References Cited
UNITED STATES PATENTS

| | | | |
|---|---|---|---|
| 807,660 | 12/1905 | Clutter | 33/151 |
| 1,535,015 | 4/1925 | Ballot | 33/174 TB |
| 2,178,045 | 10/1939 | Little | 33/79 C |
| 2,919,098 | 12/1959 | Mull et al. | 248/281 |
| 3,290,783 | 12/1966 | Carella | 33/23 R |
| 3,555,690 | 1/1971 | Matthey | 33/185 |

FOREIGN PATENTS OR APPLICATIONS
446,119 3/1968 Switzerland.................. 33/79

Primary Examiner—Robert B. Hull
Assistant Examiner—Richard R. Stearns
Attorney—Sughrue, Rothwell, Mion, Zinn & MacPeak

[57] ABSTRACT

A working member such as a feeler or making instrument is held by an articulated device that is gripped by a holder, the device being movable to reposition the working member relatively to a workpiece and a holder without the need to reposition the holder or detach the working member. The working member remains in a single plane throughout such repositioning. The device comprises three arms articulated to each other by two parallel pivots, the first arm being articulated to the holder by a pivot parallel to those connecting the arms. The working member is connected to the free end of the third arm. Means is provided to keep the first and third arms parallel to each other at all times.

8 Claims, 12 Drawing Figures 3,771,230

INVENTOR
FRANCO SARTORIO

BY Sughrue, Rothwell, Mion, Zinn & Macpeak

ATTORNEYS

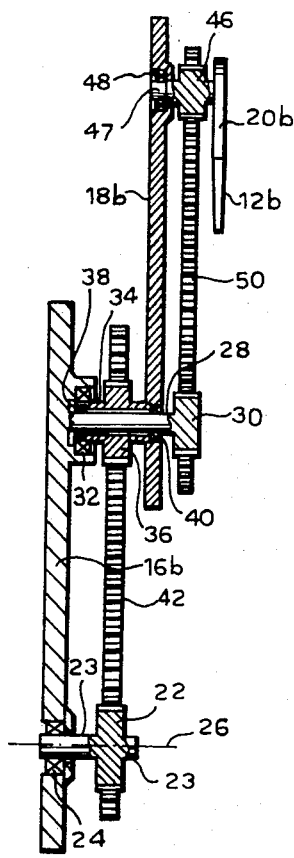
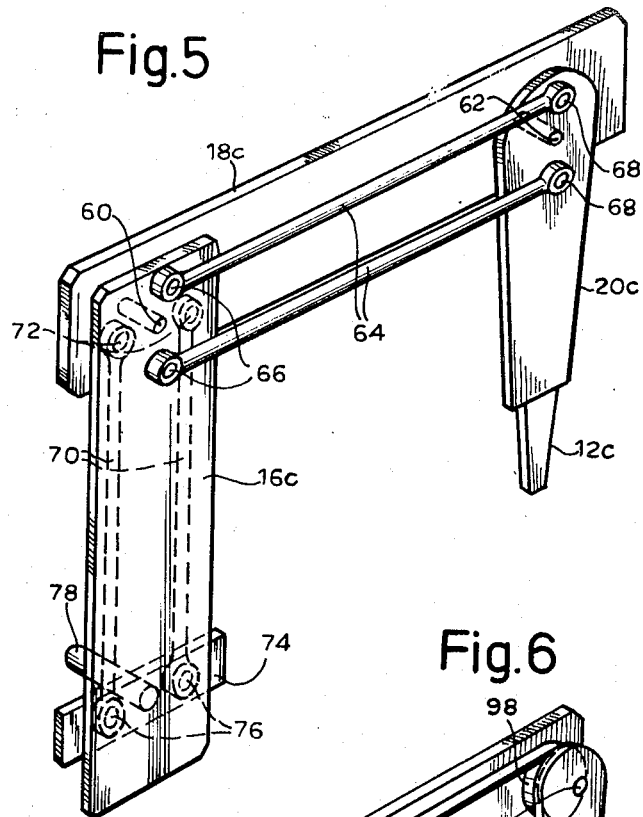
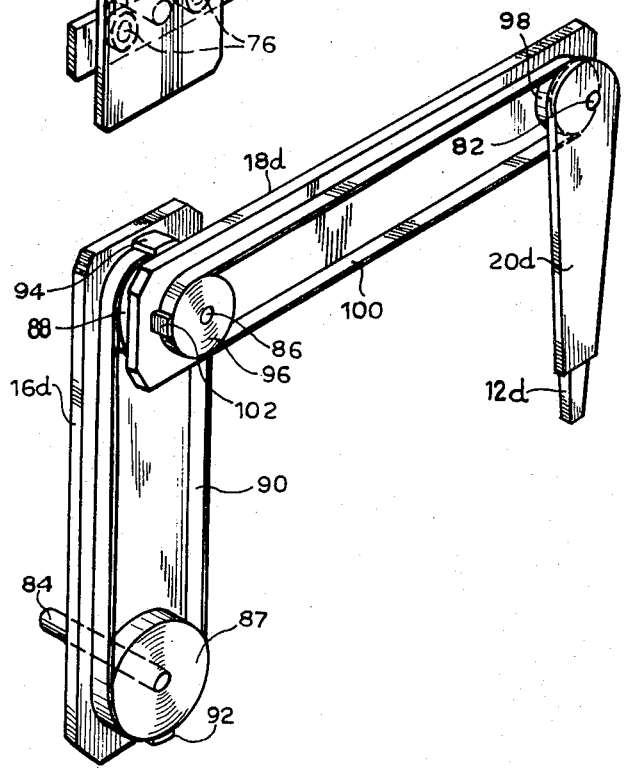

DEVICE FOR POSITIONING A WORKING MEMBER RELATIVELY TO A HOLDER AND WORKPIECE

The invention relates to a device for adjustably positioning a working member relatively to a holder carrying the working member and relatively to a workpiece on which the working member operates.

In many modern machines a working member such as a measuring probe or a milling tool is required to trace out a path in a plane relatively to a workpiece which the working member contacts and operates upon. High accuracy is usually required, and the path is often programmed or is recorded (particularly in the case of measuring machines) for reproduction later. If the path is complicated and includes undercuts or recesses or the like, great difficulty is experienced in many cases in carrying out the operation successfully, particularly as the working member is generally held rigidly in a holder.

One attempt to alleviate this difficulty has provided a mechanism in which the working member is mountable in any of several different positions in the holder. The workpiece is usually kept stationary, particularly if it is large, and the working member and holder are moved in the path. When there is a change in direction such as to require re-positioning, the co-ordinates of the point of contact between the working-member and workpiece are recorded in the "memory" of the machine, and the holder is moved away from the workpiece. When the working member is clear of the workpiece it is removed from the holder and remounted in a different position, suitable for further operation on the workpiece. The holder is then moved to a position in which the working member contacts the workpiece at the same point of contact as earlier. Working is then resumed. This solution has the disadvantage, particularly where the path is programmed or recorded by an automatic device such as a computer, that special allowance must be made for the "offset" or repositioning movement of the holder and working member in which no working takes place. This may lead to loss of time and accuracy in working, and also to intolerable complications in the programming or recording system.

In a modified version, the working member is pivotally mounted in the holder and its angular position is changed when necessary. This system suffers from much the same disadvantages.

Another known device avoids the necessity of moving the holder when the working member is repositioned. The device comprises a first arm which is mounted in the holder for rotation about a first axis. The arm has a branch extending obliquely from it and being pivotally connected at its free end to one of a second arm, the axis of this pivotal connection obliquely intersecting the first axis. At the free end of the second arm there is mounted a working member whose tip coincides with the above-mentioned point of intersection. Rotation of the device about the first axis, or rotation of the second arm relatively to the first changes in orientation of the working member but does not move its tip from its original position. In effect, the working member is movable in two conical paths whose apexes coincide with each other and with the tip of the working member. The working member thus moves in three dimensions each time it is repositioned.

This system is unsuitable for operations such as measuring, tracing and marking, in which the working member is required to lie throughout in the same plane as that in which the holder is moved and in which the working member may have a limited movement if its own relative to the device.

An object of the invention is to provide a device which overcomes or mitigates the problems outlined above, and in particular allows the working member to be repositioned relatively to the workpiece and holder without moving the holder or detaching the working member, the device maintaining the working member in its original plane throughout the repositioning operation.

According to the invention, a device for positioning a working member relatively to a workpiece and a holder is characterised by comprising three arms articulated to each other by two parallel pivots, a first of the arms being pivoted at one end to the second arm and having a free end adapted to be connected to the holder for movement about a pivot parallel to the pivots which articulate the arms, and a third of the arms being pivoted at one end to the second arm and having a free end to which the working member is attached, and including means to maintain the first and third arms parallel to each other at all times, and means to move the arms about their pivots.

The principle and various embodiments of the invention are described below with reference to the accompanying drawings, in which:

FIG. 4 is a simplified sectional view through the device of FIG. 3, seen in a different angular position from that of FIG. 3, and showing details of construction;

FIG. 5 is a simplified perspective view of a second embodiment of the invention;

FIG. 6 is a simplified perspective view of a third embodiment of the invention;

Figure 1:
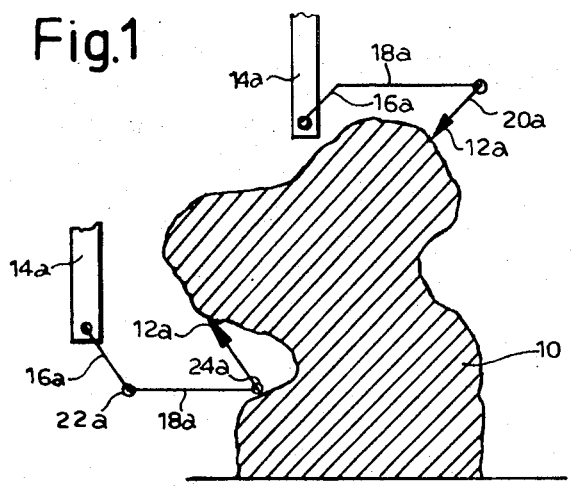
FIG. 1 is a sketch illustrating the principle of the invention.

FIG. 1 shows schematically the basic principle of the invention and the problem with which it is designed to contend. A workpiece 10 with a complex profile is required to be traversed by a working member 12a which may, for instance, be a measuring probe or a milling tool. The profile of the workpiece includes undercuts and other irregularities. If the workpiece is large, it is customary and desirable that it should be stationary and that the working member should move over the workpiece. There is a holder 14a for the working member, the required motion being imparted to the holder to move the working member in the path, which lies in a plane (in FIG. 1, the plane of the paper). The invention provides a device comprising three arms 16a, 18a and 20a with a working member 12a mounted at one end of the third arm 20a. The first arm 16a is equal in length to the combined length of the third arm 20a and the working member 12a. The three arms are articulated to each other by two parallel pivots 22a, 24a the arrangement forming three sides of a parallelogram. The first arm 16a is articulated at its free end to the holder 14a by a pivot 26a which is parallel to the pivots 22a and 24a.

Means not shown in FIG. 1 are provided to maintain the third arm 20a parallel at all times to the first arm 16a, and to move the arms about their pivots to allow them to take up a suitable position relatively to the workpiece 10. Two positions of the holder relatively to the workpiece are shown in FIG. 1, and in both cases the working member 12a is so inclined relatively to the workpiece that it can conveniently traverse the workpiece profile despite the irregularities in the profile.

Figure 2:
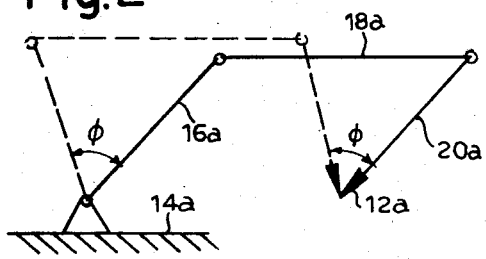
FIG. 2 is a sketch illustrating the geometry underlying the invention.

In FIG. 2, two positions of the arms of the device are shown, one in solid and the second in chain lines. Because of the geometry of the arms, it is clear that they may be moved on their pivots without altering the position in space of the tip of the working member. The tip of the working member, which in practice contacts the surface of the workpiece, thus remains fixed in space regardless of the movements of the arms relatively to each other and to the holder. No movement of the holder or removal of the working member from the holder is necessary to change the angular position of the working member; and this important advantage of the invention eliminates the problem of "offset" mentioned earlier. The geometry of the device is such that the second arm 18a moves parallel to itself during any repositioning of the device, and the angle $\phi$ moved through by the arm 16a is equal to the angle $\phi$ moved through by the arm 20a since both arms remain parallel to each other.

It will be clear that the three arms of the device and the working member, coupled with the means to keep the first and third arms parallel to each other, is similar to its action to a four-bar linkage (sometimes called an articulated parallelogram) of which one bar has been removed.

Figure 3:
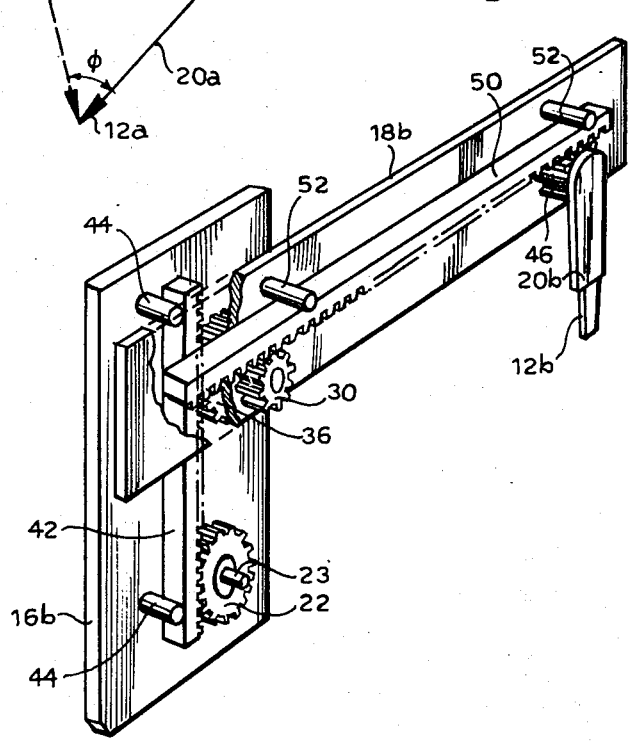
FIG. 3 is a simplified perspective view, partly broken away, of one embodiment of the invention.

FIGS. 3 and 4 show a practical embodiment in simplified form. A first arm 16b is in the form of a plate which carries at one end a pinion 22 fixed on a shaft 23 that is rotatable in bearings 24. The axis 26 (FIG. 4) of the shaft 23 is the axis for a pivotal connection between the arm 16b and a holder. The holder is not illustrated.

The other end of the arm 16b is articulated to a second arm 18b, also in the form of a plate. The arm 16b has fast with it a shaft 28 to which is rigidly attached a pinion 30. Surrounding the shaft 28 and mounted in a bearing 32 is a sleeve 34 with which is fast a pinion 36 of the same diameter as the pinion 22. The sleeve 34 rotates on the shaft 28 on the bearings 38, 40 and is fast with the second arm 18b. A rack 42 meshes with the pinions 22 and 36, and is held against transverse movement by studs 44 fixed in the arm 16b.

At its far end, the arm 18b carries an idler pinion 46 mounted on a shaft 47 that is set in a bearing 48 in the arm 18b. The pinion 46 is of the same diameter as the pinion 30 fast with the first arm, and is fast with a third arm 20b. A rack 50 meshes with the pinions 30 and 46, and is held against transverse movement by studs 52 fixed in the arm 18b. The free end of the arm 20b carries a working member 12b which may take the form of a measuring probe or the like. The distance between the axis 26 of the pinion 22 and the axis of the shaft 28 is equal to the distance between the axis of the shaft 47 and the tip of the working member 12b.

The device is arranged with the arms 16b and 20b parallel to each other. If the first arm 16b and second arm 18b pivot relatively to each other about the axis of the shaft 28, the pinion 36, being fast with the second arm 18b, causes the rack 42 to move upwards or downwards depending on the direction of rotation of the arms. This rotation also causes the rack 56 to move, transmitting rotation to the arm 20b through the pinion 46 and moving it through such an angle that the arm 20b remains parallel to the arms 16b at all times.

In practice the device of FIGS. 3 and 4, attached to a holder by a rigid connection along the shaft 23, is actuated by rotating the arm 16b, by means not shown, around the axis 26. When the working member 12b is suitably inclined, the arm 16b is locked against further movement. As long as the holder does not move, the tip of the working member remains fixed in space regardless of the angular movements of the arms 16b, 18b and 20b. Parallelism of the arms 16b and 20b is maintained by the pinions 30 and 46 and the rack 56, which ensure that each of these arms is inclined at all times to the second arm 18b at the same angle as the other arm.

FIG. 5 shows an embodiment in which the same general principles will be recognised. There is a first arm 16c, a second arm 18c, and a third arm 20c. The arms 16c and 18c are pivoted to each other by a pivot pin 60 and the arms 18c and 20c are pivoted to each other by a pivot pin 62 that is parallel to the pin 60. Parallelism between the first and third arms is maintained by a pair of connecting rods 64, 64 of equal length that are parallel to each other and are connected to the first arm 16c by pins 66, 66 that are equidistant from the pin 60 and are connected to the arm 20c by pins 68, 68 that are equidistant from the pin 62. As seen in chain lines, a further pair of connecting rods 70, 70 is connected to the second arm 18c by pins 72, 72 that are equidistant from the pin 60. The lower ends of the rods 70 are connected to a transversely extending plate 74 by pins 76, 76 that are equidistant from a pivot pin 78 connecting the plate 74 to the first arm 16c for pivotal movement. The device is intended to be connected to a holder for pivotal movement about the axis of the pin 78, the plate 74 being fixed solidly to the holder. The angular position of the arms is varied by rotating the arm 16c about the pin 78 (by means not illustrated), the arm 16c being immobilised when it is desired to lock the device in a selected position.

It is clear that when the arm 16c is rotated the rods 70 will move in opposite directions relatively to each other, and the second arm will pivot relatively to the first. Pivotal movement of the second arm relatively to the third will ensue, but because of the presence of the connecting rods 64, the first arm will be caused to rotate through the same angle relatively to the second arm as the third arm is moved through relatively to the second. The first and third arms remain parallel to each other and the tip of the working member 12c remains fixed in space throughout these movements.

The embodiment of FIG. 6 has a first arm 16d, second arm 18d and third arm 20d. The first and second arms are pivotally connected to each other by a pin 86 that is fast with the first arm. The second and third arms are connected by a pivot pin 82. The lower end of the first arm has a pivot pin 84 passing rotatably through it and carrying a wheel 87. A wheel 88 of the same diameter as the wheel 87 and of which only a small fragment is visible, is fixed rigidly to the second arm 18d and, a flexible inextensible band 90, for instance of steel, is spanned over the wheels 87 and 88 and is fiexed to them at appropriately located points by arcuate locking plates 92, 94 held in place by screws or the like (not illustrated).

The pin 86, which is fast with the first arm 16b, has rigidly attached to it a wheel 96. A wheel 98 of the same diameter as the wheel 96 is attached rigidly to the third arm 20b, and a band 100 is spanned over the wheels 96 and 98, and is connected to them by means of locking plates (of which only one, 102, is visible), and screws.

It will be clear that the device functions analogously to those of the preceding figures. The device is connected to a holder (not shown) for pivotal movement about the pins 84, and the arms are repositioned when necessary by rotating the arm 16d (by means not shown) through the required angle to change the position of the device so that the working member 12b may operate satisfactorily on the workpiece, the tip of the working member remaining fixed in space during such change of position. The wheel 96, being solid with the arm 16d, co-operates with the band 100 and wheel 98 to maintain the arms 16d and 20d parallel to each other whatever theposition of the three arms.

Tension adjusting means (not illustrated) might be provided along the length of the bands 90 and 100, in zones that do not at any time contact the wheels on which the bands are spanned, to allow the band tension to be set initially to the correct value and adjusted periodically if necessary.

Figure 7:
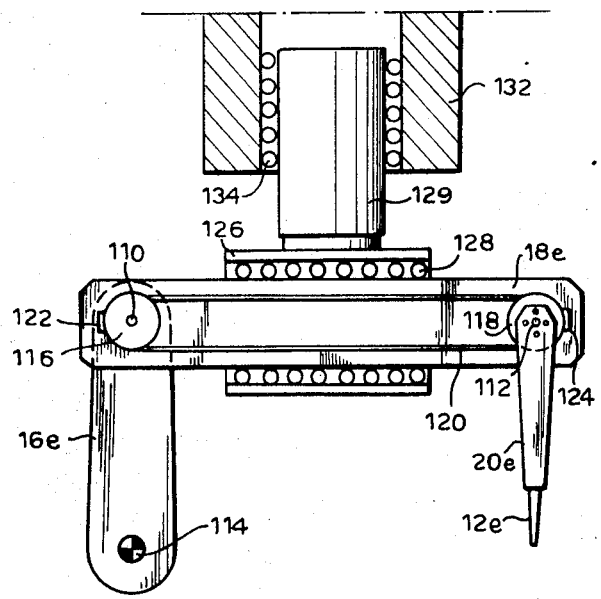
FIG. 7 is a simplified elevational view, partly sectioned, of a fourth embodiment of the invention.

Another variant of the invention is seen in FIG. 7. There is a first arm 16e, articulated by mean of a pivot pin 110 to a second arm 18e, the pin 110 being solid with the arm 16e, and a third arm 20e articulated to the second arm by a pivot pin 112. The arm 16e has a pivot 114 at its free end, this pivot being in practice mounted in a holder (not illustrated). Fixedly rigidly on the pin 110, and thus solid with the arm 16e, is a wheel 116. A wheel of the same diameter is fixed solidly to the arm 20e concentrically with the pin 112. A flexible inextensible band 120 is spanned over the wheels 116 and 118 and is secured to them by locking plates 122 and 124 and screws (not shown).

The second arm 18e is guided for movement parallel to itself by sliding in a guide member 126 along a precision track lines by rollers 128. The guide member has a shank 129 rigidly attached to it, the shank being guided for movement perpendicularly to the track in the guide member 126. The shank 129 slides in a sleeve 132 that is lined by rollers 134 to define another precision track. The angle between the track of the guide member 126 and sleeve 132 is not necessarily a right angle. The sleeve 132 is fixed to or forms part of the holder.

The device is actuated by rotating the first arm 16e about the axis of the pivot 114 by means not illustrated. Rotation of the arm 16e is transmitted through the pivot 110 to the second arm 18e, which reciprocates in the guide member 126 while the shank 129 reciprocates simultaneously in the sleeve 132. The arm 20e is kept parallel to the arm 16e by the action of the wheels 110 and 118 and the band 120.

The embodiment of FIG. 7 has the advantage that great accuracy is possible in maintaining the axis of the working member 12e stationary, regardless of changes in the angular position of the arms, since the second arm is positively constrained by the guide member 126 to move parallel to itself.

Figure 10:
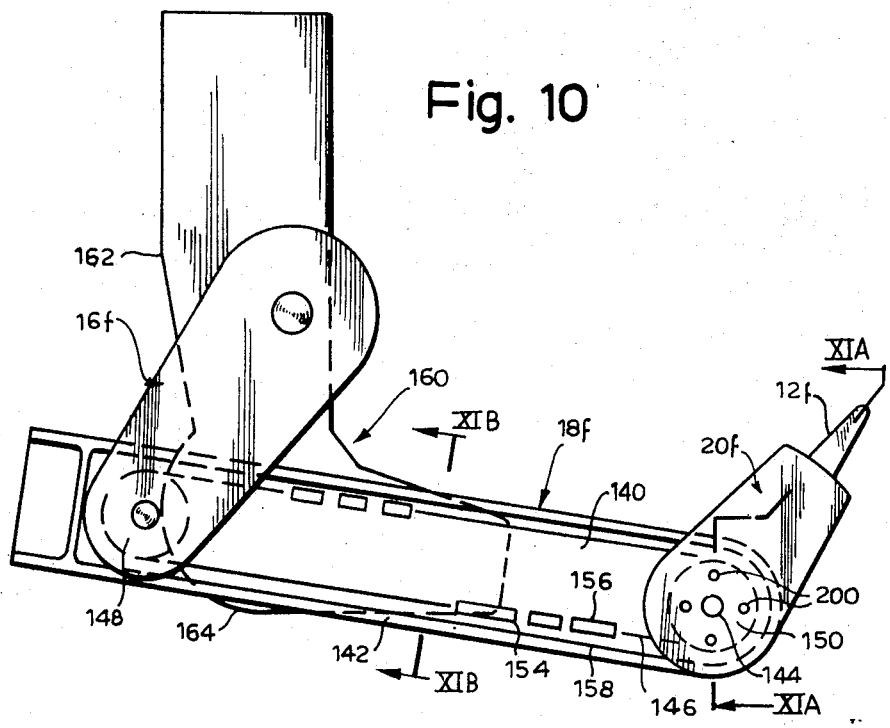
FIG. 10 is a side elevation view of the arms and guide member of the device of FIGS. 8 and 9, detached from the holder.
Figure 8:
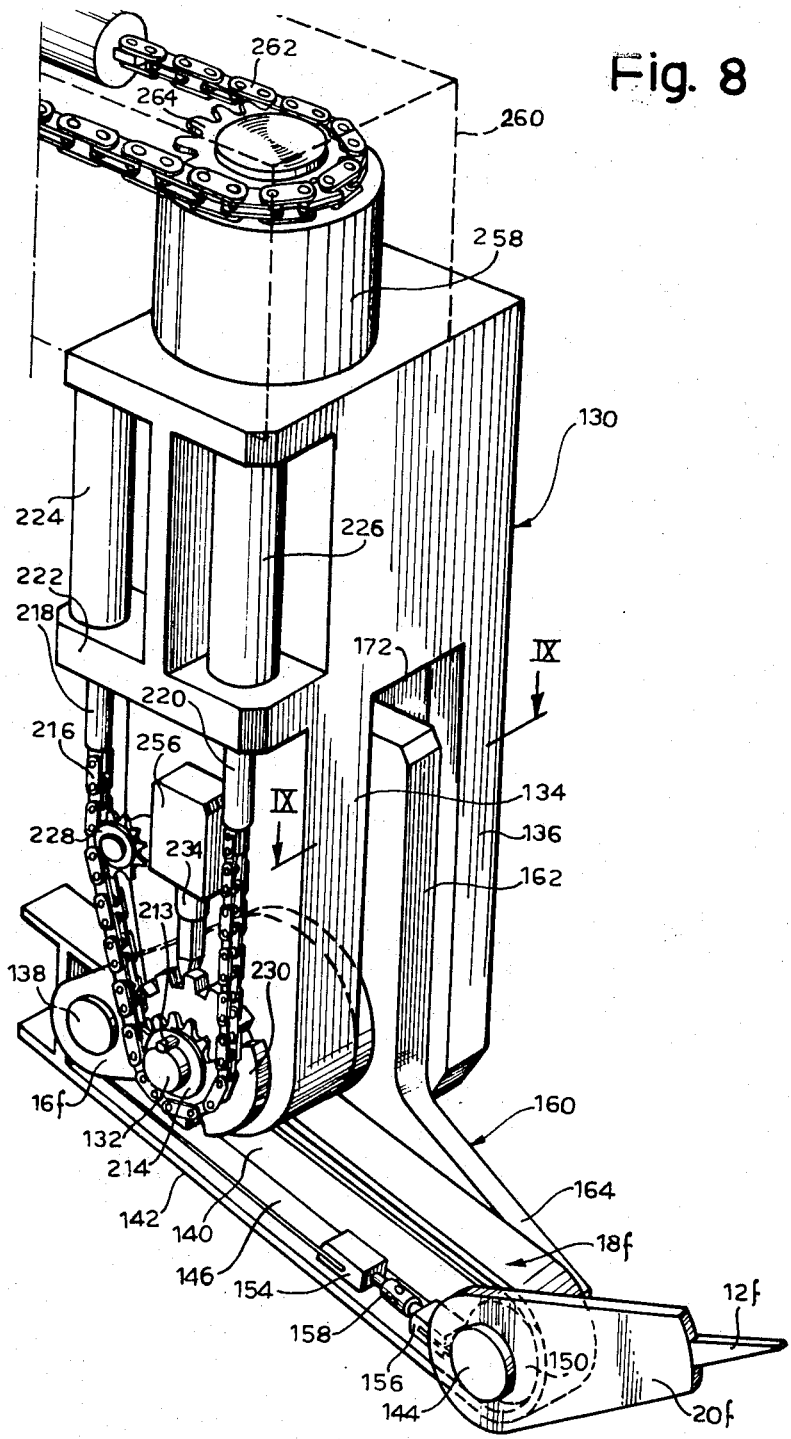
FIG. 8 is a perspective view of a modified form of the embodiment of FIG. 7, showing in detail the means for moving the arms.

FIG. 8 shows a highly accurate device designed for use in a machine for measuring large workpieces by running a peg-like feeler or probe 12f over the surface of workpiece. The device has a first arm 16f in the form of a plate connected to a holder 130 for pivotal movement about the axis of a pivot pin 132 that is fast with the arm 16f and connects that arm to a first branch 134 of the holder 130, the holder having a second branch 136 spaced away from the first. The upper end of the arm 16f, as seen in FIG. 8, is located between the vertically downwardly extending branches 134 and 136. The first arm 16f is connected to a second arm 18f for movement about a pivot 138. As seen in FIGS. 8 and 10 the arm 18f comprises a web portion 140 surrounded by a transverse flange 142.

A third arm 20f in the form of a plate is connected to the second arm 18f for movement about a pivot pin 144, with the probe 12f fixed to the free end of the arm 20f. As in the other embodiments, the first, second and third arms form three sides of a parallelogram of which the fourth side is absent. Parallelism between the first and third arms is maintained by a flexible inextensible band 146 that is located in the shallow space defined by the flange 142 of the second arm 18f, and which is spanned under suitable tension over a wheel 148 (seen in dash lines in FIG. 10) that is fast with the arm 16f and a wheel 150 (also seen in dash lines) that is fast with the third arm 20f. The band is connected to the wheels 148 and 150 by means not shown, and includes two tensioning devices each comprising two terminals 154, 156 connected by a threaded rod 158 which is of left-hand thread for part of its length and right-hand thread for another part, the rod being screwed into complementally threaded holes in the terminals 154, 156. Rotation of the rod 158 by means of an appropriate tool causes tensioning or slackening of the band, depending on the direction of rotation.

Figure 9:
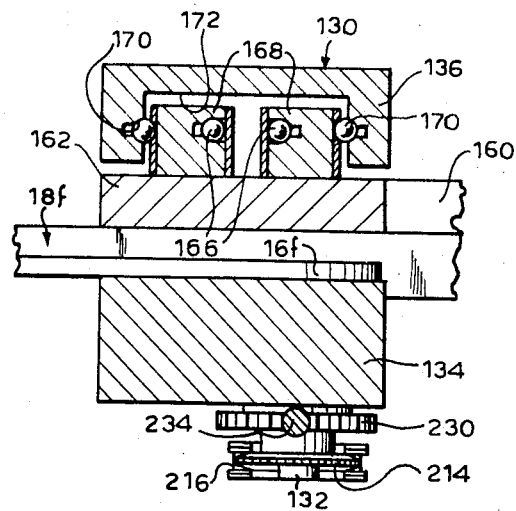
FIG. 9 is a sectional view on the line IX—IX of FIG. 8, showing details of means of support for the second arm of the device.

The second arm 18f is constrained to move parallel to itself by a guide member 160 formed of plate and cut in angular shape to have an upper limb 162, seen extending vertiallly in the drawings, and a lower limb 164 extending obliquely. The limb 162 carries a series of rolling elements such as balls 166 (FIG. 9) held in cages 168, the balls 166 rolling in a precision track defined by complemental grooves 170 in a recess extending vertically in the branch 136 of the holder 130.

Figure 11:
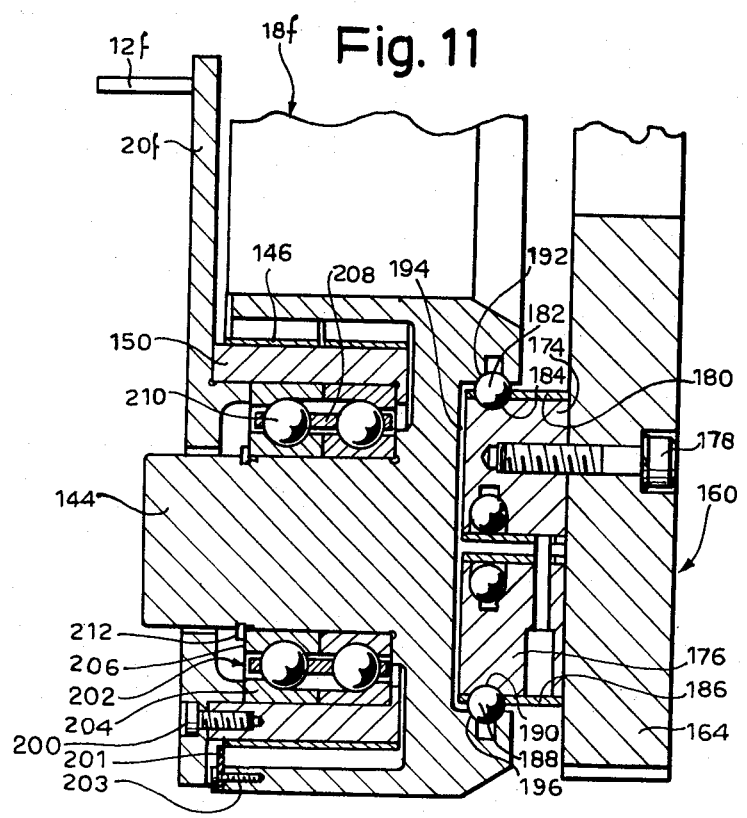
FIG. 11 is a composite sectional view on the lines XIA—XIA and XIB—XIB of FIG. 10.
Figure 12:
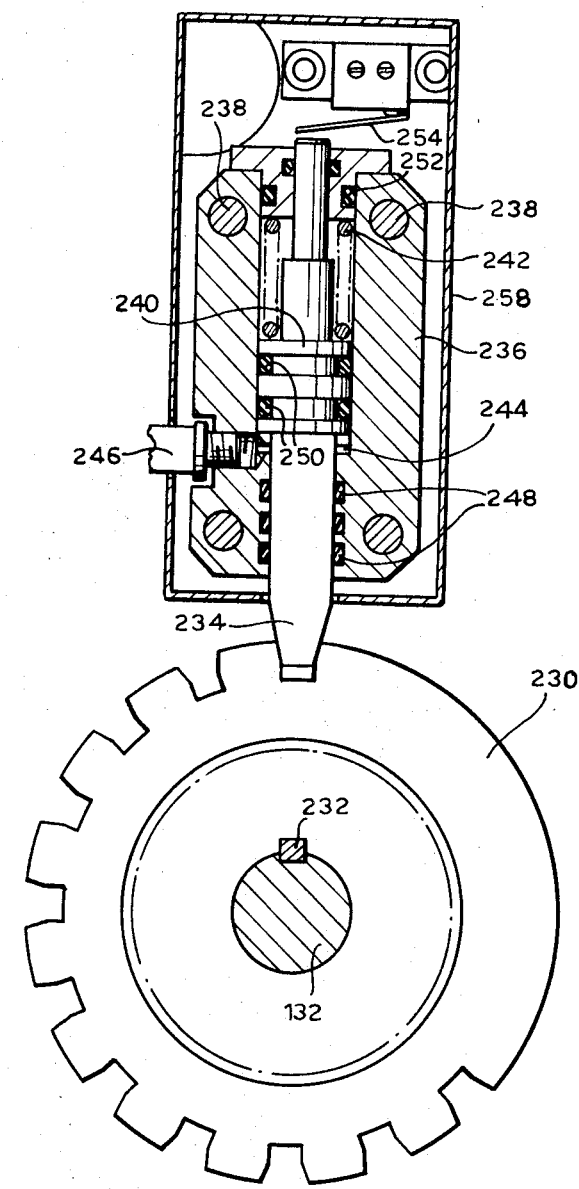
FIG. 12 is a sectional view through a locking mechanism of the device of FIGS. 8 to 11.

As best seen in FIG. 11, which is a composite view showing a section through the arms 18f and 20f along the lines XIA—XIA in FIG. 10 and a section through the limb 164 along the line XIB—XIB in FIG. 10, the libm 164 of the guide member 160 is formed with two longitudinal precision rails 174, 176 that are secured to the limb 164 parallel to each other by screws 178. The rail 174 is surrounded by a flexible cage 180 carrying rolling elements such as balls 182 that roll in a precision groove 184. The rail 176 carries a similar cage 186 with balls 188 rolling in a precision groove 190. The balls 182 engage in a precision groove 192 in a recess 194 of the arm 18f, and the balls 188 roll in a similar precision groove 196 in the recess 194. This construction allows the arm 18f to reciprocate along the limb 164 of the guide member 166 with low friction and great accuracy.

FIG. 11 also shows the wheel 150 rigidly attached to the arm 20f by screws 200 and engaging the pivot pin 144 through the interposition of a ball bearing 202 of which the races 204, 206 cage 208 and balls 210 are visible. A circlip 212 holds the bearings 202 on the pin 144. The band 146 extends round the wheel 150 and is held against transverse movement by an annular flange 201 secured to the arm 18f by screws 203. A similar construction is used at the pivot pin 138 at the other end of the arm 18f.

As seen in FIG. 8, the pin 132 at the end of the arm 16f connected to the holder 130 is connected by a key 213 to a sprocket wheel 214 which is driven by a chain 216 connected between two vertical plungers 218, 220 that extend through holes in a flange 222 of the holder 130. The plunger 218 is actuated by a double-acting hydraulic cylinder 224 attached to the holder and the plunger 220 is actuated by a similar cylinder 226. The hydraulic connections to these cylinder and the necessary controls are not shown, being of conventional design. The cylinders 224 and 226 are coordinated so that on falling of the plunger 218 the plunger 220 rises, and vice-versa. Such movement causes the chain 216, which passes over an idler sprocket wheel 228 mounted on the holder 130, to turn the sprocket wheel 214 and this cause rotation of the arm 16f about the axis of the pivot pin 132. This in turn causes the arm 18f to pivot relatively to the arm 16f about the pivot pin 138. The arm 18f moves parallel to itself, its movement being resolved into two components one of which comprises the reciprocating movement of the arm along the limb 164 of the guide member 160, the second being the vertical movement of the guide member 160 on the rollers 166 upward or downward in the branch 136 of the holder 130.

The arm 20f remains parallel to the arm 16f becuase of the action of the band 146 and the wheels 148 and 150, much as described with reference to FIG. 7. The tip of the probe 12f thus remains fixed in space.

In the embodiment of FIGS. 8 to 12 the probe 12f retains its position within an accuracy of 0.01 mm. with a rotation of the arm 20f through an angle approaching 270°.

A mechanism is provided to lock the arms in a selected position. This mechanism comprises a wheel 230 (FIGS. 8 and 12) that is toothed for about 270° of its circumference and is attached by a key 232 or the like to the pin 132. Fixed to the holder 130 above the wheel is a latch device comprising a latch member 234 shaped to engage in the space between two adjacent teeth of the wheel 230 and hold it stationary. The latch is mounted in a cylinder 236 which is secured by screws 238 to the holder 130. The shaft of the latch is formed as a piston 240 and is biased towards the locking position by a spring 242 housed in the cylinder 236. Below the piston is a chamber 244 into which hydraulic liquid can be forced, against the action of the spring 242, through a port 246. The external hydraulic circuit and controls are not shown. Seals 248, 250 and 252 are provided to prevent escape of liquid. The upper end of the latch extends through the body of the cylinder and is arranged, when in its uppermost position, to actuate an electrical switch 254. The electrical circuit of which the switch 254 forms part is not shown. The system is so arranged that, when it is desired to change the position of the arms, liquid is pumped into the chamber 244 through the port 246 to raise the latch 234 against the action of the spring 242. When the top of the latch actuates the switch 252, the supply of liquid is automatically stopped without the liquid in the chamber 244 being allowed to escape. After the cylinders 224 and 246 have been actuated to move the arms to the selected new position, the pressure on the liquid in the chamber 244 is released and the latch 234 returns downwards, locking in the nearest available space between two teeth of the wheel 230. Locking in a position intermediate two teeth is not possible but is unnecessary in a measuring machine. The mechanism described is covered by a cap 256 having a hole through which the latch 234 may move.

As seen in FIG. 8, the holder 130 may be rotatable relatively to the machine, having for instance, a stub axle 258 at its top, the stub axle being held (by mean not illustrated) on the machine, which is indicated by dash lines 260, and being rotated by a chain 262 engaging a sprocket wheel 264 fast with the stub axle 258. This allows greater flexibility in the operation of the machine.

What I claim is:

1. A device for positioning a working member relative to a workpiece comprising a holder, a first arm pivotally connected at one end to said holder by a first pivot, a second arm pivotally connected at one end to the other end of said first arm by a second pivot, a third arm pivotally connected at one end to the other end of said second arm by a third pivot and extending in the same direction from said second arm as said first arm, and a working member connected to the other end of said third arm to be a distance from said third pivot equal to the distance between said first and second pivots, said pivots being disposed parallel to each other, connecting means for maintaining said first and third arms parallel to each other at all times during pivotal movement of said arms and slide guide means movably mounted on said holder for positively guiding said second arm for movement parallel to itself.

2. A device as set forth in claim 1 wherein said guide means comprises a guide member having first track means on which said second arm is arranged for reciprocating movement, said guide member having a mounting limb extending at an angle to said first track means and second track means disposed on said holder upon which said limb is guided for reciprocating movement.

3. A device as set forth in claim 2 wherein said first and second track means include precision tracks lined with rolling elements retained in a cage.

4. A device as set forth in claim 1 further comprising a sprocket wheel secured to said first arm and arranged coaxially with said first pivot means for rotating said sprocket wheel to rotate said first arm about said first pivot.

5. A device as set forth in claim 1 further comprising locking means for locking said arms in a selected position.

6. A device as set forth in claim 5 wherein said locking means comprises a toothed wheel secured to said first arm and arranged coaxially with said first pivot and a latch device secured to said holder and including a latch member movable between a position in which it is engaged between adjacent teeth of the toothed wheel in a position in which it is retracted from said wheel.

7. A device as set forth in claim 6 wherein said latch member is biased towards its locking position and including hydraulic means to move said latch member from its locking position to its retracted position while said arms are being repositioned.

8. A device as set forth in claim 1 further comprising means for rotating said holder about an axis orthogonal to the axes of the pivots connecting the arms to each other and to the holder.

* * * * *